United States Patent
Noh et al.

(10) Patent No.: US 9,860,877 B2
(45) Date of Patent: *Jan. 2, 2018

(54) METHOD AND APPARATUS FOR ALLOCATING TRANSMISSION CHANNEL IN WIRELESS LOCAL AREA NETWORK SYSTEM

(71) Applicant: LG ELECTRONICS INC., Seoul (KR)

(72) Inventors: Yu Jin Noh, Anyang-si (KR); Dae Won Lee, Anyang-si (KR); Byeong Woo Kang, Anyang-si (KR); Bong Hoe Kim, Anyang-si (KR); Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/142,379

(22) Filed: Apr. 29, 2016

(65) Prior Publication Data

US 2016/0249339 A1 Aug. 25, 2016

Related U.S. Application Data

(63) Continuation of application No. 14/685,055, filed on Apr. 13, 2015, now Pat. No. 9,363,796, which is a
(Continued)

(30) Foreign Application Priority Data

Apr. 19, 2010 (KR) ........................ 10-2010-0035917

(51) Int. Cl.
*H04W 72/04* (2009.01)
*H04L 5/00* (2006.01)
(Continued)

(52) U.S. Cl.
CPC ...... *H04W 72/0406* (2013.01); *H04B 7/0413* (2013.01); *H04L 5/001* (2013.01);
(Continued)

(58) Field of Classification Search
CPC ..... H04W 28/06; H04W 72/04; H04W 74/08; H04L 5/00
See application file for complete search history.

(56) References Cited

U.S. PATENT DOCUMENTS 5,774,805 A * 6/1998 Zicker ................. H04M 1/2745
455/426.1
8,625,562 B2 * 1/2014 Noh ..................... H04W 72/042
370/338

(Continued)

FOREIGN PATENT DOCUMENTS

KR 10-2005-0122235 12/2005
KR 10-2009-0016937 2/2009
(Continued)

OTHER PUBLICATIONS

U.S. Appl. No. 61/261,108 by Raja Banerjea, Yong Liu and Hongyuan Zhang "11 ac Band Support" Nov. 13, 2009.*
(Continued)

*Primary Examiner* — Xavier Szewai Wong
(74) *Attorney, Agent, or Firm* — Lee Hong Degerman Kang & Waimey

(57) ABSTRACT

According to one embodiment, a method for a wireless local area includes: generating a medium access control (MAC) protocol data unit (MPDU) to be transmitted to a target station; generating a physical layer convergence procedure (PLCP) protocol data unit (PPDU) by attaching a PLCP preamble to the MPDU; selecting a transmission channel; and transmitting the PPDU to the target station over the transmission channel. Selecting the transmission channel
(Continued)

includes: performing clear channel assessment (CCA) on a first channel to determine whether the first channel is idle; and only after it is determined that the first channel is idle, selecting the first channel and at least one idle second channel as the transmission channel. The PLCP preamble includes channel allocation information indicating a bandwidth of the transmission channel.

8 Claims, 9 Drawing Sheets

Related U.S. Application Data continuation of application No. 14/089,565, filed on Nov. 25, 2013, now Pat. No. 9,031,051, which is a continuation of application No. 13/579,513, filed as application No. PCT/KR2011/001336 on Feb. 25, 2011, now Pat. No. 8,625,562.

(60) Provisional application No. 61/319,273, filed on Mar. 31, 2010, provisional application No. 61/308,310, filed on Feb. 26, 2010.

(51) Int. Cl.
| | |
|---|---|
| *H04B 7/04* | (2017.01) |
| *H04W 72/08* | (2009.01) |
| *H04B 7/0413* | (2017.01) |
| *H04L 29/12* | (2006.01) |
| *H04L 29/06* | (2006.01) |
| *H04L 29/08* | (2006.01) |
| *H04W 84/12* | (2009.01) |
| *H04W 28/06* | (2009.01) |
| *H04W 88/08* | (2009.01) |

(52) U.S. Cl.
CPC .......... *H04L 61/6022* (2013.01); *H04L 69/22* (2013.01); *H04L 69/323* (2013.01); *H04L 69/324* (2013.01); *H04W 72/04* (2013.01); *H04W 72/042* (2013.01); *H04W 72/085* (2013.01); *H04L 5/0033* (2013.01); *H04L 5/0044* (2013.01); *H04L 5/0094* (2013.01); *H04W 28/065* (2013.01); *H04W 84/12* (2013.01); *H04W 88/08* (2013.01)

(56) References Cited

U.S. PATENT DOCUMENTS

| | | | | |
|---|---|---|---|---|
| 9,031,051 | B2* | 5/2015 | Noh | H04W 72/042 |
| | | | | 370/338 |
| 9,363,796 | B2* | 6/2016 | Noh | H04W 72/04 |
| 2003/0016647 | A1* | 1/2003 | Margon | H04L 12/4013 |
| | | | | 370/342 |
| 2005/0165946 | A1 | 7/2005 | Stephens | |
| 2006/0050728 | A1* | 3/2006 | Sung | H04L 12/413 |
| | | | | 370/448 |
| 2006/0165036 | A1* | 7/2006 | Chandra | H04L 47/26 |
| | | | | 370/329 |
| 2007/0133473 | A1* | 6/2007 | Takagi | H04W 74/08 |
| | | | | 370/334 |
| 2007/0195811 | A1* | 8/2007 | Basson | H04L 1/0026 |
| | | | | 370/441 |
| 2007/0217378 | A1 | 9/2007 | Moorti et al. | |
| 2009/0103485 | A1 | 4/2009 | Singh et al. | |
| 2010/0174961 | A1 | 7/2010 | Chae et al. | |
| 2011/0110353 | A1 | 5/2011 | Hansen et al. | |
| 2011/0116401 | A1* | 5/2011 | Banerjea | H04W 74/0816 |
| | | | | 370/252 |
| 2011/0149927 | A1 | 6/2011 | Stacey et al. | |
| 2011/0207488 | A1 | 8/2011 | Gong | |
| 2015/0223205 | A1 | 8/2015 | Noh et al. | |

FOREIGN PATENT DOCUMENTS

| | | |
|---|---|---|
| KR | 10-2009-0124881 | 3/2009 |
| KR | 10-2010-0005672 | 1/2010 |

OTHER PUBLICATIONS

Korean Intellectual Property Office Application Serial No. 10-2010-0035917, Notice of Allowance dated Feb. 26, 2016, 5 pages.
IEEE 802.11-09/099208, "Wireless LANs, TGac Spec Framework" by Robert Stacey, Intel, Sep. 2010, 40 pages.

* cited by examiner

[Fig. 1]
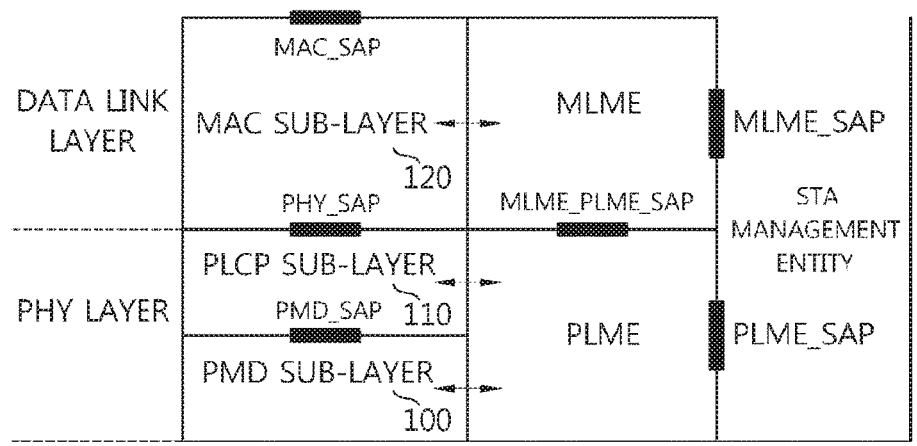

[Fig. 2]
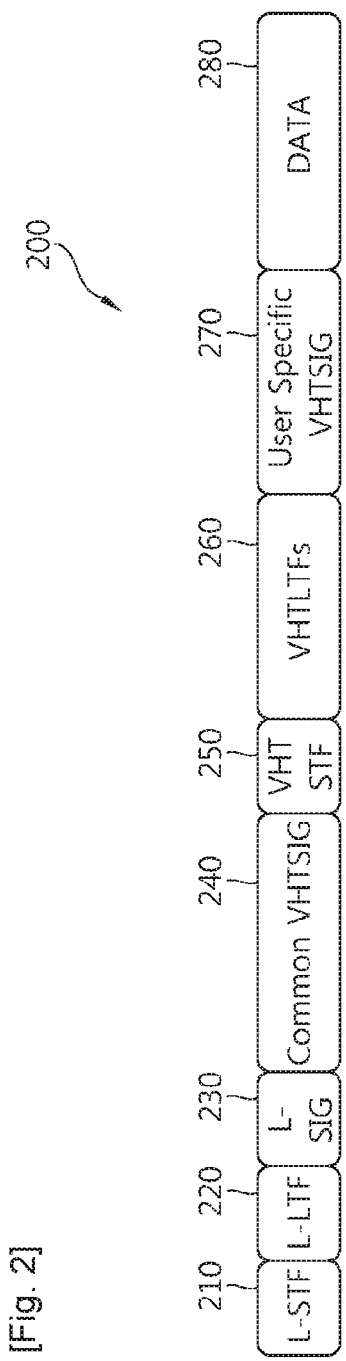

[Fig. 3]
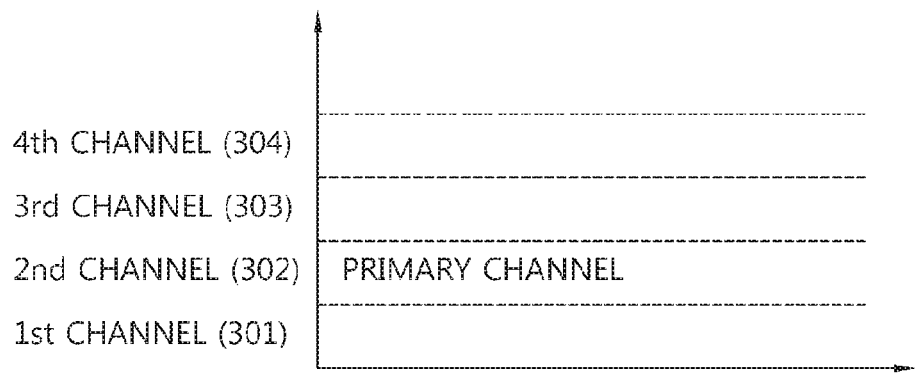

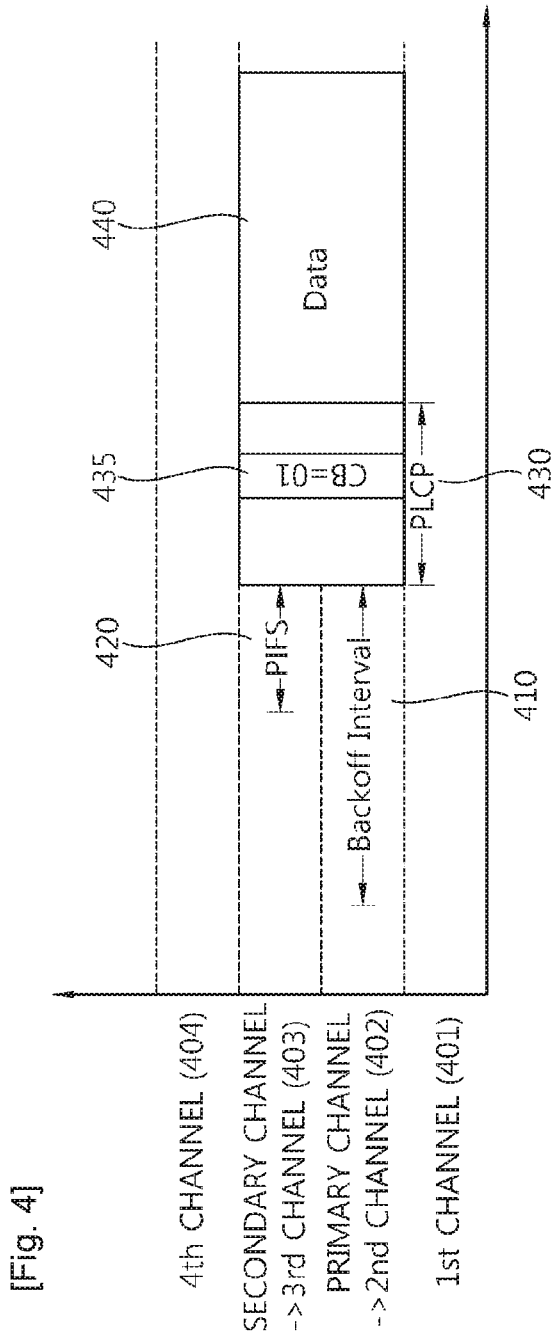

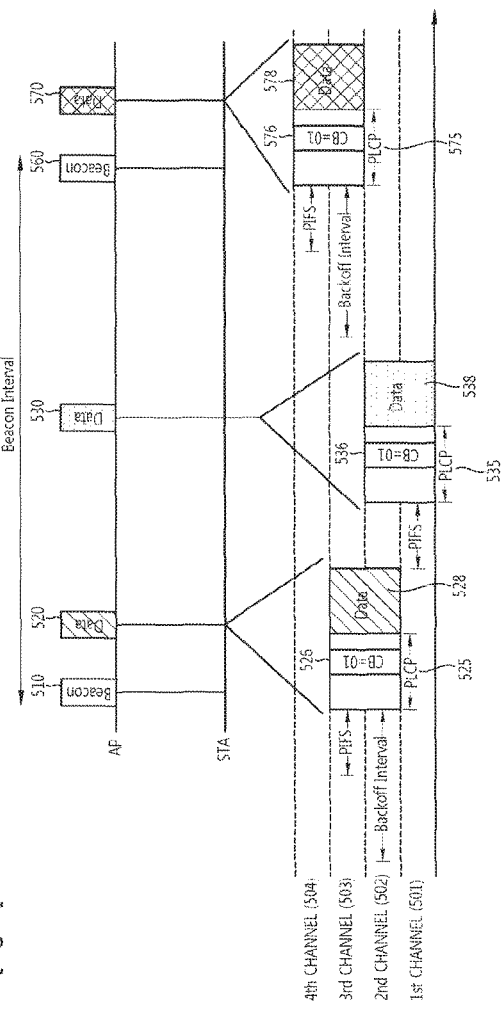
[Fig. 5]

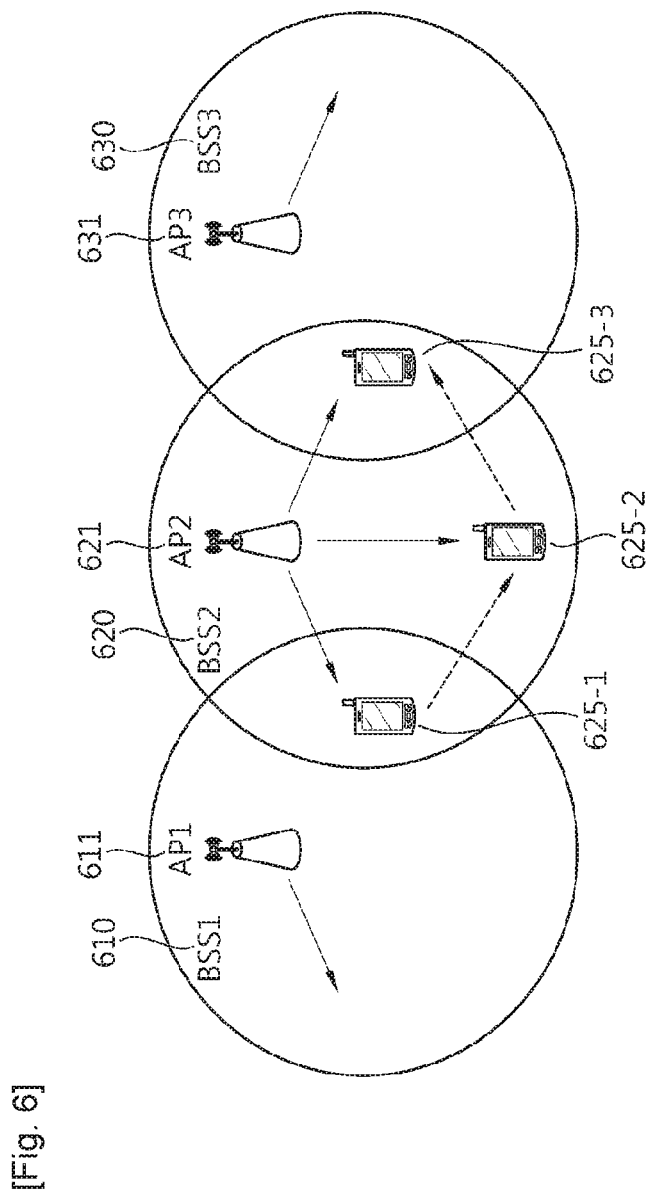
[Fig. 6]

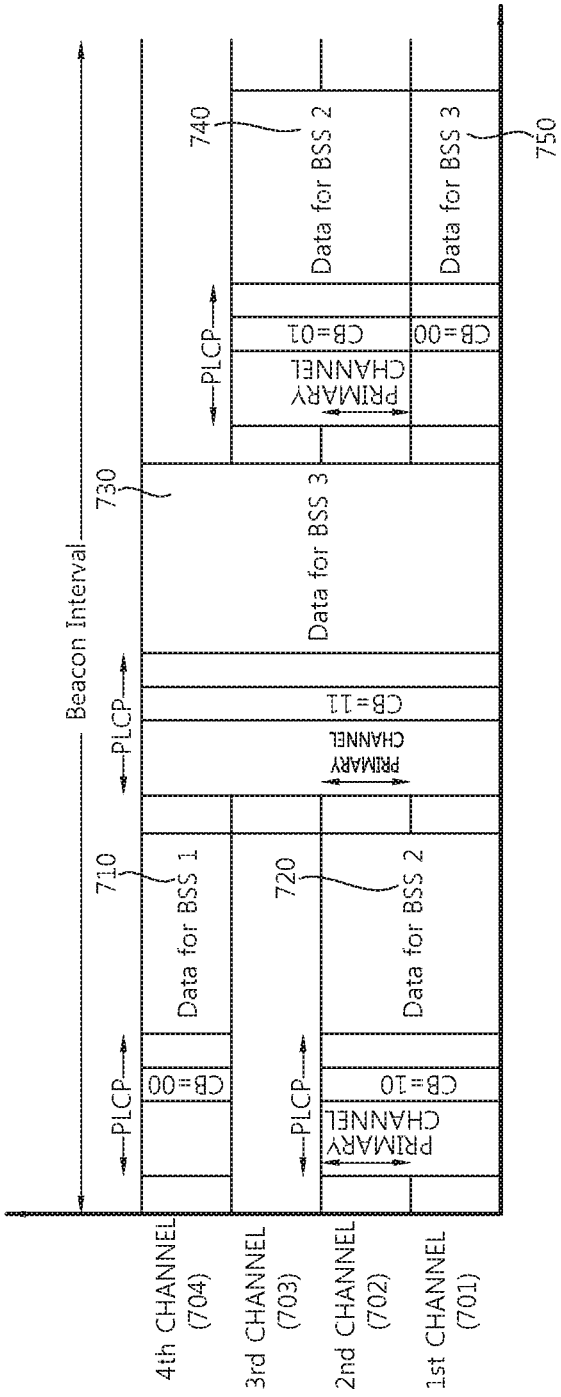
[Fig. 7]

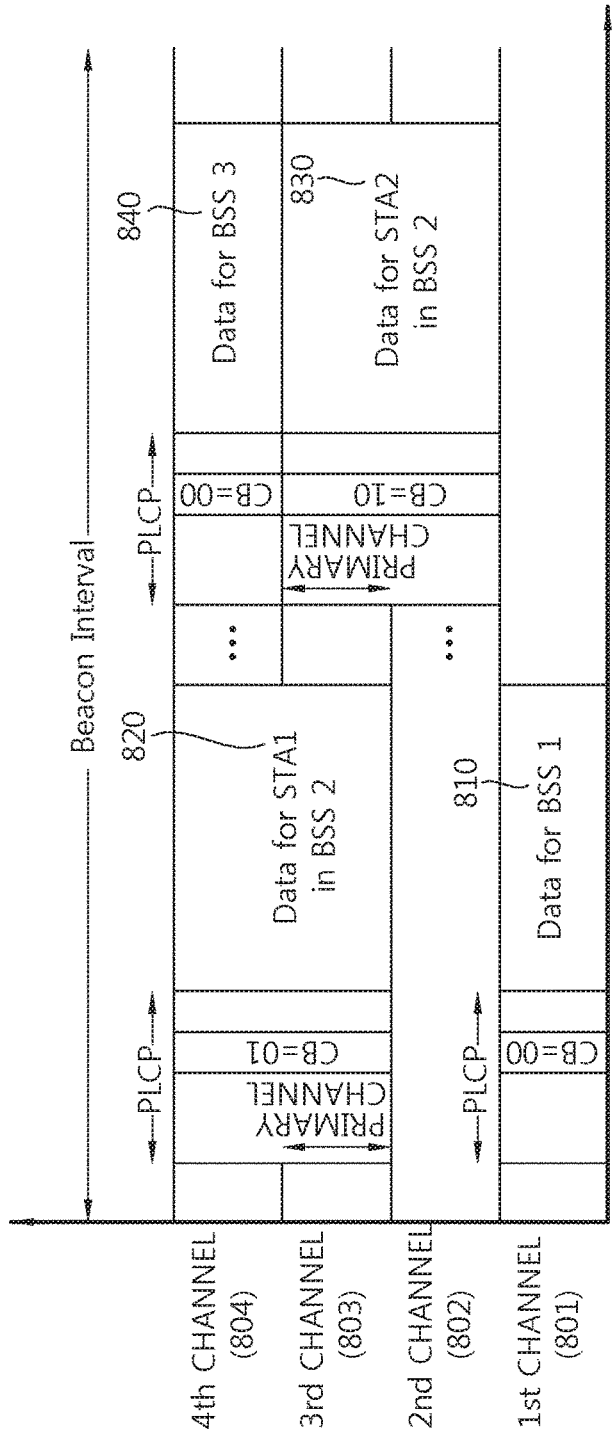

[Fig. 9]
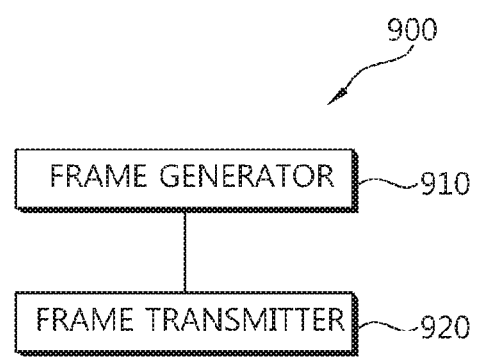

METHOD AND APPARATUS FOR ALLOCATING TRANSMISSION CHANNEL IN WIRELESS LOCAL AREA NETWORK SYSTEM

CROSS-REFERENCE TO RELATED APPLICATIONS

This application is a continuation of U.S. patent application Ser. No. 14/685,055, filed on Apr. 13, 2015, now U.S. Pat. No. 9,363,796, which is a continuation of U.S. patent application Ser. No. 14/089,565, filed on Nov. 25, 2013, now U.S. Pat. No. 9,031,051, which is a continuation of U.S. patent application Ser. No. 13/579,513, filed on Aug. 16, 2012, now U.S. Pat. No. 8,625,562, which is the National Stage filing under 35 U.S.C. 371 of International Application No. PCT/KR2011/001336, filed on Feb. 25, 2011, which claims the benefit of U.S. Provisional Application No. 61/308,310, filed on Feb. 26, 2010, and 61/319,273, filed on Mar. 31, 2010, and also claims the benefit of earlier filing date and right of priority to Korean Application No. 10-2010-0035917, filed on Apr. 19, 2010, the contents of all of which are hereby incorporated by reference herein in their entirety.

TECHNICAL FIELD

The present invention relates to wireless communications, and more particularly, to a method of allocating a transmission channel in a wireless local area network (WLAN) system and an apparatus supporting the method.

BACKGROUND ART

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

Ever since the institute of electrical and electronics engineers (IEEE) 802, i.e., a standardization organization for WLAN technologies, was established in February 1980, many standardization works have been conducted.

In the initial WLAN technology, a frequency of 2.4 GHz was used according to the IEEE 802.11 to support a data rate of 1 to 2 Mbps by using frequency hopping, spread spectrum, infrared communication, etc. Recently, the WLAN technology can support a data rate of up to 54 Mbps by using orthogonal frequency division multiplex (OFDM). In addition, the IEEE 802.11 is developing or commercializing standards of various technologies such as quality of service (QoS) improvement, access point protocol compatibility, security enhancement, radio resource measurement, wireless access in vehicular environments, fast roaming, mesh networks, inter-working with external networks, wireless network management, etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to 540 Mbps or higher, and is based on a multiple input and multiple output (MIMO) technique which uses multiple antennas in both a transmitter and a receiver to minimize a transmission error and to optimize a data rate. In addition, this standard may use a coding scheme which transmits several duplicate copies to increase data reliability and also may use the OFDM to support a higher data rate.

With the widespread use of the WLAN and the diversification of applications using the WLAN, there is a recent demand for a new WLAN system to support a higher throughput than a data processing rate supported by the IEEE 802.11n. A very high throughput (VHT) WLAN system is one of IEEE 802.11 WLAN systems which have recently been proposed to support a data processing rate of 1 Gbps or higher. The VHT system is named arbitrarily. To provide a throughput of 1 Gbps or higher, a feasibility test is currently being conducted for the VHT system using 88 MIMO and a channel bandwidth of 80 MHz.

In general, a case where a bandwidth of 80 MHz can be fully used by different communication systems or devices that use the same frequency band is very limited. In addition, since a hotspot for providing a WLAN service is increased as the WLAN is widely used and utilized, an overlapping basic service set (OBSS) environment is increased in which a basic service area (BSA) which is a service area of that hotspot overlaps partially or fully. In such an OBSS environment, the channel bandwidth of 80 MHz can be partially or fully used by a neighboring BSS. Therefore, there is a need for a method for determining a channel for transmitting data adaptively according to a change in a channel condition of a full bandwidth that can be used in a WLAN system, and an apparatus supporting the method.

SUMMARY OF INVENTION

Technical Problem

The present invention provides a method of transmitting a frame by selecting/allocating an optimal channel and bandwidth adaptively to a change in a channel condition in a wireless local area network (WLAN) system that uses a channel consisting of several sub-channels, and an apparatus supporting the method.

Solution to Problem

In an aspect, a method of allocating a channel in a wireless local area network (WLAN) system includes generating a MAC protocol data unit (MPDU) to be transmitted to a target station (STA), generating a PLCP protocol data unit (PPDU) by attaching a physical layer convergence procedure (PLCP) header to the MPDU, and transmitting the PPDU to the STA, wherein the PLCP header includes channel allocation information for transmission of the PPDU.

The channel allocation information may be a relative position of a secondary channel with respect to a primary channel.

The channel allocation information may be channel bandwidth information of a secondary channel and a channel number of the secondary channel.

The channel allocation information may be included in a VHTSIG field included in the PLCP header in a format of indicating whether to allocate each channel used in transmission.

An allocated transmission channel indicated in the channel allocation information may be determined by being sensed by an access point (AP).

The AP may determine whether to allocate the channel according to a channel noise or interference level obtained as a result of the sensing.

In another aspect, a wireless apparatus for transmitting channel allocation information in a wireless local area network (WLAN) system includes a frame generator for generating a MAC protocol data unit (MPDU) to be transmitted to a target station (STA), and a frame transmitter for transmitting the MPDU to the target STA, wherein a physical layer convergence procedure (PLCP) header of the MPDU includes channel allocation information for transmission of a PLCP protocol data unit (PPDU).

Advantageous Effects of Invention

According to the present invention, an optimal channel and a bandwidth thereof are selected/allocated adaptively to a channel condition, and thus an overall system throughput can be improved and data can be transmitted reliably with small transmit power.

BRIEF DESCRIPTION OF DRAWINGS

FIG. 1 shows an IEEE 802.11 physical layer architecture.

FIG. 2 is a diagram showing an example of a PPDU frame structure.

FIG. 3 shows an example of a channel that can be used in a VHT WLAN system.

FIG. 4 shows an example of channel allocation and PPDU transmission based on the channel allocation according to an embodiment of the present invention.

FIG. 5 is an example of dynamic channel allocation according to an embodiment of the present invention.

FIG. 6 shows an example of an OBSS environment to which an embodiment of the present invention is applicable.

FIG. 7 shows an OBSS environment according to an embodiment of the present invention.

FIG. 8 shows an example of secondary channel allocation for each STA and data frame transmission based on the secondary channel allocation according to an embodiment of the present invention.

FIG. 9 is a block diagram showing a wireless apparatus for implementing an embodiment of the present invention.

MODE FOR THE INVENTION

Hereinafter, exemplary embodiments of the present invention will be described with reference to the accompanying drawings.

A wireless local area network (WLAN) system according to an embodiment of the present invention includes at least one basic service set (BSS). The BSS is a set of stations (STAs) successfully synchronized to communicate with one another. The BSS can be classified into an independent BSS (IBSS) and an infrastructure BSS.

The BSS includes at least one STA and an access point (AP). The AP is a functional medium for providing a connection to STAs in the BSS through respective wireless media. The AP can also be referred to as other terminologies such as a centralized controller, a base station (BS), a scheduler, etc.

The STA is any functional medium including a medium access control (MAC) and wireless-medium physical layer (PHY) interface satisfying the institute of electrical and electronics engineers (IEEE) 802.11 standard. The STA may be an AP or a non-AP STA. Hereinafter, the STA refers to the non-AP STA unless specified otherwise. The STA may also be referred to as other terminologies such as a user equipment (UE), a mobile station (MS), a mobile terminal (MT), a handheld device, an interface card, etc.

The STA can be classified into a VHT-STA, an HT-STA, and a legacy (L)-STA. The HT-STA is an STA supporting IEEE 802.11n. The L-STA is an STA supporting a previous version of IEEE 802.11n, for example, IEEE 802.11a/b/g. The L-STA is also referred to as a non-HT STA.

FIG. 1 shows an IEEE 802.11 physical layer architecture.

The IEEE 802.11 physical (PHY) architecture includes a PHY layer management entity (PLME), a physical layer convergence procedure (PLCP) sub-layer 110, and a physical medium dependent (PMD) sub-layer 100. The PLME provides a PHY management function in cooperation with a MAC layer management entity (MLME). The PLCP sub-layer 110 located between a MAC sub-layer 120 and the PMD sub-layer 100 delivers to the PMD sub-layer 100 a MAC protocol data unit (MPDU) received from the MAC sub-layer 120 under the instruction of the MAC layer 120, or delivers to the MAC sub-layer 120 a frame received from the PMD sub-layer 100. The PMD sub-layer 100 is a lower layer of the PLCP sub-layer and serves to enable transmission and reception of a PHY entity between two STAs through a radio medium.

The PLCP sub-layer 110 attaches an additional field including information required by a PHY transceiver to the MPDU in a process of receiving the MPDU from the MAC sub-layer 120 and delivering the MPDU to the PMD sub-layer 100. The additional field attached in this case may be a PLCP preamble, a PLCP header, tail bits required on a data field, etc. The PLCP preamble serves to allow a receiver to prepare a synchronization function and antenna diversity before a PLCP service data unit (PSDU=MPDU) is transmitted. The PLCP header includes a field that contains frame information, which will be described below in greater detail with reference to FIG. 2.

The PLCP sub-layer 110 generates a PLCP protocol data unit (PPDU) by attaching the aforementioned field to the MPDU and transmits the generated PPDU to a reception STA via the PMD sub-layer. The reception STA receives the PPDU, acquires information required for data recovery from the PLCP preamble and the PLCP header, and recovers the data.

FIG. 2 is a diagram showing an example of a PPDU frame structure.

A PPDU frame 200 includes an L-STF 210, an L-LTF 220, an L-SIG 230, a common VHTSIG 240, a VHTSTF 250, a plurality of VHTLTFs 260, a user specific VHTSIG 270, and data 280.

A PLCP sub-layer converts an MPDU delivered from a MAC layer into the data 280 of FIG. 2 by attaching required information to the MPDU, generates the PPDU frame 200 by attaching various fields such as the L-STF 210, the L-LTF 220, the L-SIG 230, the common VHTSIG 240, the VHT-STF 250, the VHTLTFs 260, the user specific VHTSIG 270, etc., and transmits the PPDU frame 200 to one or more STAs through a PMD layer.

The L-STF 210 is used for frame timing acquisition, automatic gain control (AGC), coarse frequency acquisition, etc.

The L-LTF 220 is used for channel estimation for demodulation of the L-SIG 230 and the common VHTSIG 240.

The VHTSTF 250 is used by a VHT-STA to improve AGC estimation.

The plurality of VHTLTFs 260 are configured for the use of channel estimation for demodulation of the VHTSIG 270 and the data 280. This may be referred to as a data VHT-LTF. In addition, an extension VHT-LTF for channel sounding may be used.

A short training field (STF) such as the L-STF 210 and the VHTSTF 250 is used for frame timing acquisition, AGC, etc., and thus is also called a synchronization signal or a synchronization channel. That is, the STF is used to establish synchronization between STAs or between an STA and an AP.

A long training field (LTF) such as the L-LTF 220 and the VHTLTFs 260 is used for channel estimation for demodulation of data and/or control information, and thus is also called a reference signal, a training signal, or a preamble.

The L-SIG 230 and the VHTSIGs 240 and 270 provide a variety of information necessary for data demodulation and decoding, and thus are also called control information.

The common VHTSIG 240 may include common control information which is common between transmission target STAs, and for example, may include at least one of fields of Table 1.

TABLE 1

| Field name | Description |
|---|---|
| SIG-B length | It indicates a length of a VHTSIG-B. |
| MU-MIMO indicator | It indicates whether MU-MIMO is used, or may be used to toggle SU-MIMO/MU-MIMO. |
| bandwidth | It indicates a channel bandwidth. |
| STA indicator | It indicates an STA for receiving the VHTSIG-B. It may also indicate an STA address or may indicate an STA ID or an index of the VHTSIG-B. |
| Multiplexing count | It indicates the number of STAs (or users) to be multiplexed using MU-MIMO. |
| Decoding indicator | it indicates information for decoding the VHTSIG-B. |

The user specific VHTSIG 270 may include control information for each of a plurality of transmission target STAs, and for example, may include at least one of fields of Table 2.

TABLE 2

| Field name | Description |
|---|---|
| MCS | It indicates modulation and coding scheme (MCS) information required for data decoding. |
| STA ID | It indicates an STA for using the MCS. |

In Tables 1 and 2 above, the field name is for exemplary purposes only, and thus other terms may also be used. The fields of Tables 1 and 2 above are for exemplary purposes only, and thus certain fields may be omitted and other fields may be further added. In addition, a PPDU frame based on the PPDU frame format exemplified in FIG. 2 is generated in a PLCP sub-layer of the STA, and is transmitted to a transmission target STA via a PMD sub-layer. Some parts of the PPDU frame field of FIG. 2 may be omitted, or may be added optionally.

FIG. 3 shows an example of a channel that can be used in a VHT WLAN system. In the example of FIG. 3, the channel used in the VHT WLAN system includes a $1^{st}$ channel 301, a $2^{nd}$ channel 302, a $3^{rd}$ channel 303, and a $4^{th}$ channel 304. A bandwidth of each sub-channel is 20 MHz, and thus a full channel bandwidth may be 80 MHz. Although it is described hereinafter that a channel of 80 MHz consists of 4 sub-channels having a bandwidth of 20 MHz for example, this is only for convenience of explanation, and thus technical features of the present invention are not limited thereto. A bandwidth of each sub-channel can be set variously such as 5 MHz, 6 MHz, 40 MHz, etc., and the number of sub-channels can also be set variously. Thus, the full bandwidth of the channel can exceed 80 MHz. In additional, the respective sub-channels may be non-contiguous.

According an embodiment of the present invention, an AP and an STA use a channel bandwidth of 80 MHz, and can transmit/receive a PPDU by using a bandwidth of 20 MHZ (for one sub-channel), 40 MHz (for two sub-channels), or 80 MHz (for four sub-channels or for a full bandwidth). Hereinafter, a case of transmitting the PPDU by using a bandwidth of N MHz is called N MHz transmission.

When the STA performs 20 MHz transmission, a channel to be used for transmission is allocated by the AP to the STA as a primary channel. In IBSS, an STA for performing a role of an AP in an infrastructure BSS is designated, and a technique described hereinafter may be equally applied thereto. It is assumed hereinafter that operations are performed in the infrastructure BSS.

Allocation of the primary channel may be achieved by receiving information indicating the primary channel to be used by the STA from the AP. The information indicating the primary channel to be used by the STA may be transmitted in such a format that it is included in a primary channel field, and the primary channel field may be transmitted as a part of a VHT operation element.

The VHT operation element includes information required for an operation of an VHT STA, and for example, may include primary channel information, secondary channel information, information indicating whether reduced inter-frame spacing (RIFS) is used, information indicating whether an HT STA or an L-STA exists in the BSS, etc. The VHT operation element may be transmitted to the STA by using an association response frame, a re-association response frame, a probe response frame, a beacon frame, etc., or may be transmitted by using a separate management action frame for transmission of the VHT operation element.

In the present invention, the STA to which the primary channel is allocated may confirm that the primary channel is idle, and then may receive/transmit a PPDU through the primary channel.

The STA that performs 40 MHz transmission receives/transmits a PPDU by using the primary channel and a secondary channel which are allocated to the STA. The AP/STA confirms that the primary channel is idle, and if the secondary channel is idle for a specific time period (e.g., PCF inter-frame spacing (PIFS)), may subsequently transmit a PPDU by using a channel of 40 MHz (i.e., the primary channel+the secondary channel).

In this case, how to allocate the secondary channel may be problematic. In an IEEE 802.11n standard in which a channel bandwidth of 20 MHz or 40 MHz is used, the primary channel and the secondary channel are sequentially allocated. For example, if it is assumed that the AP and the STA have 40 MHz channel bandwidth capability and a channel number is given, channel allocation is achieved in such a format as (primary channel, secondary channel)=(x, x−1) or (primary channel, secondary channel)=(x, x+1) with respect to a primary channel #x.

According to the embodiment of the present invention, the AP allocates a channel corresponding to a boundary channel among channels having an 80 MHz (or higher) channel bandwidth as the primary channel. That is, the AP allocates the $2^{nd}$ channel 302 or the $3^{rd}$ channel 303, not the $1^{st}$ channel 301 or the $4^{th}$ channel 304, as the primary channel. In FIG. 3, the $2^{nd}$ channel 302 is allocated as the primary channel for example. If the primary channel is allocated to the $2^{nd}$ channel 302 or the $3^{rd}$ channel 303, not a boundary band of the full channel band, then the number of combinations of channels that can be allocated as the primary channel and the secondary channel is increased, and thus frequency spectrum can be more effectively utilized.

According to the present invention, a transmission channel can be switched in each frame unit (i.e., PPDU unit) in which allocation information of the secondary channel is transmitted by being included in a PLCP header. By performing transmission through a channel having small noise or interference in an adaptive manner on the basis of a channel condition according to dynamic allocation of a transmission channel in a frame unit, a throughput can be improved and power consumption can be reduced. This is because the PPDU can be transmitted by using low transmit power when data is transmitted through a channel having relatively small noise and interference. In addition, it is possible to effectively cope with interference caused by a neighboring BSS in an overlapping BSS (OBSS), and this will be described below in greater detail.

As an example of dynamically allocating the secondary channel in a frame unit, secondary channel indication information may be included in a VHTSIG field. For example, the VHTSIG field may include a secondary channel indication bit consisting of one bit, so that if a secondary channel indication bit value is 0, it is reported to the STA that a channel above the primary channel is allocated as the secondary channel, and if the secondary channel indication bit value is 1, it is reported to the STA that a channel below the primary channel is allocated as the secondary channel.

As another example of dynamically allocating the secondary channel in the frame unit, a channel bandwidth allocated to the VHTSIG field and a channel bandwidth indicator CB indicating the channel may be included. The CB (also referred to as CW) may be set in 2 bits, and an example thereof is shown in Table 3.

TABLE 3

| Setting value | Meaning (allocated channel and bandwidth) |
|---|---|
| 00 | 20 MHz |
| 01 | 40 MHz-a primary channel and another channel above the primary channel |
| 10 | 40 MHz-a primary channel and another channel below the primary channel |
| 11 | 80 MHz |

The STA can know the secondary channel in addition to a bandwidth allocated to the STA according to the setting value of the CB transmitted by being included in the VHTSIG field.

As another example of dynamically allocating the secondary channel in the frame unit, information on a channel allocated to the VHTSIG field and bandwidth information can be expressed in a bitmap when transmitted. According to the present embodiment, the channel bandwidth indicator CB is included in the VHTSIG field when transmitted. In this case, if there are four channels, i.e., $1^{st}$, $2^{nd}$, $3^{rd}$, and $4^{th}$ channels as shown in the example of FIG. 3, the CB may have a bit indicating an allocation status of each channel, and thus may have a value of 4 bits. For one example, when the $1^{st}$ and $3^{rd}$ channels are allocated, the CB may be set to '1010'. For another example, when it is intended to use the $1^{st}$, $3^{rd}$, and $4^{th}$ channels for 60 MHz transmission, the CB may be set to '1011'. The bitmap expression may be effectively utilized when the secondary channel is set to a channel not contiguous to the primary channel.

When it is intended to transmit data by using a bandwidth of 40 MHz, 60 MHz, or 80 MHz, the STA confirms allocated channel information from the VHTSIG. The STA confirms that the primary channel is idle. If the secondary channel and an extension channel are also idle during a PIFS time period before a backoff counter of the primary channel expires, a PPDU can be transmitted by using the bandwidth of 40 MHz, 60 MHz, or 80 MHz.

FIG. 4 shows an example of channel allocation and PPDU transmission based on the channel allocation according to an embodiment of the present invention.

It is shown in FIG. 4 that an AP and an STA which have 80 MHz channel bandwidth capability transmit/receive a PPDU by using a bandwidth of 40 MHz. The AP selects/allocates a primary channel by considering a noise and interference level or the like. In the example of FIG. 4, a $2^{nd}$ channel 402 is allocated as the primary channel. If a $3^{rd}$ channel 403 allocated as a secondary channel is idle during a PIFS time period 420 before a backoff counter of the $2^{nd}$ channel allocated as the primary channel expires, the AP can transmit a 40 MHz PPDU through the primary channel and the secondary channel. In this case, the AP reports secondary channel allocation information to the STA by using a VHTSIG field in addition to transmission of a VHT operation element by setting a secondary channel offset value. That is, by transmitting information indicating whether the secondary channel is a channel above the primary channel or a channel below the primary channel by using the VHTSIG field, the secondary channel can be selected/allocated in a frame unit. In the example of FIG. 4, a CB value of the VHTSIG field is transmitted by setting the value to '01' according to the example of FIG. 3, so as to report to the STA that the $3^{rd}$ channel 403 is allocated as the secondary channel. The STA knows that the $3^{rd}$ channel is allocated as the secondary channel from the CB value of the VHTSIG field, and thus can receive and decode the 40 MHz PPDU transmitted by using the $2^{nd}$ channel and the 3 channel.

FIG. 5 is an example of dynamic channel allocation according to an embodiment of the present invention.

It is assumed that an AP allocates a primary channel to an STA by using a beacon frame 510, then transmits a data frame 520 and a data frame 530, and then transmits a beacon frame 560 and a data frame 570. The AP allocates a $2^{nd}$ channel 502 by using the beacon frame 510 as the primary channel by considering each channel's interference, noise level, etc. If a backoff interval expires and if a $3^{rd}$ channel 503 is idle during a PIFS time period before the backoff interval expires, the AP transmits the data frame 520 with 40 MHz transmission through the $2^{nd}$ channel 502 and the $3^{rd}$ channel 503. In this case, the data frame 520 includes a PLCP header 525 and a data field 528. Secondary channel allocation information is included in the PLCP header 525. In the example of FIG. 5, a transmission method of the secondary channel allocation information is shown based on the example of Table 3. It is indicated that a value of a CB 526 is set to '01' and thus a secondary channel is allocated as a channel above the primary channel. Upon confirming the CB value of the PLCP, the STA knows that the $3^{rd}$ sub-channel is allocated as the secondary channel, and thus can receive and decode the data frame 520 transmitted through the $2^{nd}$ channel and the $3^{rd}$ channel.

If a result of sensing the $3^{rd}$ channel 503 when the AP transmits the data frame 530 (herein, either one or both of a physical carrier sensing function or a virtual carrier sensing function may be used) shows that the channel is busy or interference is significant, the AP may set a value of a CW 536 included in a PLCP header 535 of the data frame 530 differently from when the data frame 520 is transmitted. If a result of sensing the $1^{st}$ channel 501 shows that the $1^{st}$ channel 501 is idle in a situation where the $3^{rd}$ channel 503 cannot be used because the $3^{rd}$ channel 503 is busy or interference is significant in the example of FIG. 5, the AP may allocate a $1^{st}$ channel 501 as the secondary channel by setting the CW value to '10'. By using the CW 536, the STA knows that the secondary channel is allocated to the $1^{st}$ channel 501, and thus can recognize, receive, and decode the data frame 530 transmitted through the $2^{nd}$ channel 502 and the $1^{st}$ channel 501.

If the use of the $2^{nd}$ channel 502 is limited due to a change in a channel environment of the $2^{nd}$ channel 502 after the data frame 530 is transmitted, the AP may switch the primary channel from the $2^{nd}$ channel 502 to the $3^{rd}$ channel 503 by using the beacon frame 560. Upon receiving the beacon frame 560, the STA knows that the primary channel is allocated to the $3^{rd}$ channel 503 (i.e., the channel is switched from the $2^{nd}$ channel to the $3^{rd}$ channel), obtains secondary channel information by confirming a CW included in a PLCP header 575 of the data frame 570, and thus can receive and decode the data frame on the basis of the obtained secondary channel information.

FIG. 6 shows an example of an OBSS environment to which an embodiment of the present invention is applicable. A BSS2 620 operates in an OBSS environment in which a basic service area (BSA) partially overlaps with a BSS1 610 and a BSS3 630. In this case, an example of channel allocation in a process of transmitting/receiving a PPDU among an STA 625-1, an STA 625-2, and an STA 625-3 will be described. The STA 625-1, the STA 625-2, and the STA 625-3 may be an exemplary situation in which one STA moves within a BSA of the BSS2 620 or an exemplary situation in which the STAs receive influence of the BSS1 610 and the BSS3 630 according to a change in a BSA of the BSS1 610 and the BSS3 630.

FIG. 7 shows an OBSS environment according to an embodiment of the present invention.

The STA 625-1 operating in the BSS2 620 in the example of FIG. 6 operates by using a $2^{nd}$ channel 702 allocated by an AP2 621 as a primary channel. The STA 625-1 is located within the BSA of the BSS1 610, and is affected when an AP1 611 transmits/receives a PPDU with respect to STAs (not shown) within the BSS1 610. In this case, it is assumed that the AP1 611 transmits/receives the PPDU with respect to the STAs (not shown) within the BSS1 610 by using a $4^{th}$ channel 704 (as indicated by 710 of FIG. 7. The AP2 621 allocates the 2nd channel 702 as the primary channel, and knows that the $4^{th}$ channel 704 is busy in the BSS1 610 as a result of sensing the remaining channels (i.e., a $1^{st}$ channel 701, a $3^{rd}$ channel 703, and the $4^{th}$ channel 704). The AP2 621 inserts channel allocation information to a PLCP header and transmits it to the STA 625-1 in order to allocate the $1^{st}$ channel 701 as a secondary channel by using the same method as shown in the example of FIG. 5. Upon receiving this, the STA 625-1 can receive a data frame 720 with 40 MHz transmission through the $2^{nd}$ channel 702 and the $1^{st}$ channel 701.

Thereafter, it is assumed that the STA 625-1 moves to the STA 625-2. In this case, as a result of sensing the $1^{st}$ channel 701, the $3^{rd}$ channel 703, and the $4^{th}$ channel 704, the AP2 621 knows that all of the channels can be used, and thus can transmit a data frame 730 by fully using a bandwidth of 80 MHz. For this, channel allocation information CB included in a PLCP header of the data frame 730 is set to '11' in the transmission of the data frame 730. The STA 625-2 may know that 80 MHz transmission is performed by confirming the CW value which is set to '11'.

Thereafter, it is also assumed that the STA 625-2 moves again to the STA 625-3. In this case, as a result of sensing the $1^{st}$ channel 701, the $3^{rd}$ channel 703, and the $4^{th}$ channel 704, the AP2 621 knows that a data frame 750 is transmitted through the $1^{st}$ channel 701 in the BSS3 630. The AP2 621 may set the $3^{rd}$ channel 703 as the secondary channel, and may transmit a data frame 740 with 40 MHz transmission by using the $2^{nd}$ channel and the $3^{rd}$ channel.

In a case where the $1^{st}$ channel 701 and the $2^{nd}$ channel 702 are allocated as the primary channel and the secondary channel according to the conventional method, 40 MHz transmission is performed even if the data frame 730 is transmitted to the STA 625-2, which hinders the effective use of frequency spectrum. In addition, when the data frame 740 is transmitted to the STA 625-3, even if the $3^{rd}$ channel 703 can be used because the $1^{st}$ channel 701 cannot be used, 20 MHz transmission has to be performed. As such, in case of dynamic channel allocation in a PPDU unit of the present invention, frequency spectrum can be effectively used by performing optimal channel allocation adaptively to a change in a channel environment.

Meanwhile, the AP may have 80 MHz channel bandwidth capability, and the STA in the BSS may have 40 MHz channel bandwidth capability. In this case, since the STA has 40 MHz capability, the STA can perform clear channel assessment (CCA) only for a channel bandwidth less than or equal to 40 MHz. If a frame including primary channel and secondary channel allocation information is broadcast in this environment, the primary channel and the secondary channel are allocated to all STAs within the BSS. That is, the STA may perform the CCA only for channels having the same frequency band of 40 MHz. As a result, a problem may arise in the support of dynamic secondary channel switching. This is because complexity of the STA and implementation costs may be increased to support a situation in which a channel of which a channel condition is measured by the STA through CCA has to change rapidly according to the dynamic allocation method.

As a method of solving the aforementioned problem, the present invention proposes a method in which the STA1 and the STA2 in the BSS measure a channel bandwidth of 40 MHz in different situations. According to an embodiment, a different secondary channel may be allocated for each STA. That is, a primary channel is allocated to the STA1 and the STA2 by using a frame including a VHT operation element such as a beacon frame or the like, but different secondary channels are allocated to the STA1 and the STA2.

FIG. 8 shows an example of secondary channel allocation for each STA and data frame transmission based on the secondary channel allocation according to an embodiment of the present invention.

It is assumed that an STA1 and an STA2 having 40 MHz channel bandwidth capability operate in a BSS2 in an OBSS environment as shown in FIG. 6. The STA1 may perform CCA with respect to a bandwidth of 40 MHz which is the sum of bandwidths of a 3 channel 803 and a $4^{th}$ channel 804, and the STA2 may perform CCA with respect to a bandwidth of 40 MHz which is the same of bandwidths of the $3^{rd}$ channel 803 and a $2^{nd}$ channel 802. In this case, an AP2 allocates the $3^{rd}$ channel 803 to the STA1 and the STA2 as a primary channel. In this case, as shown in the example of FIG. 8, a data frame 820 and a data frame 830 may be transmitted to the STA1 and the STA2 through a variable available channel according to channel usage of neighboring BSS1 and BSS3 which constitute the OBSS environment.

As an embodiment for supporting such a method, an AP allocates a different secondary channel to each STA within a BSS by using a VHT operation element of a beacon frame. In this case, information indicating the secondary channel allocated for each STA is included in the VHT operation element.

As another embodiment for supporting such a method, the secondary channel may be allocated at the request of the STA other than allocating a secondary channel by the AP. In this method, the STA transmits its channel bandwidth and channel information to be used to the AP. A new frame used for transmission of the channel bandwidth to be used by the STA and the channel information to be used may be defined for use, and a notify channel width action frame of the conventional IEEE 802.11n standard may be extended for use.

The notify channel width action frame of the IEEE 802.11n standard is transmitted to another STA or AP when the STA intends to change the channel bandwidth. The notify channel width action frame includes a channel bandwidth field for indicating a channel bandwidth to be changed in addition to a category field for explaining contents and functions of the frame. Table 4 below shows setting of the channel bandwidth field specified in the IEEE 802.11 In standard.

TABLE 4

| Value | Meaning |
| --- | --- |
| 0 | Channel bandwidth of 20 MHz |
| 1 | Any channel bandwidth within a channel bandwidth set range supported by an STA |
| 2-255 | Reserved |

Table 5 shows an example of modified channel bandwidth field setting according to an embodiment of the present invention.

TABLE 5

| Value | Meaning |
| --- | --- |
| 0 | 20 MHz-a primary channel |
| 1 | 40 MHz-the primary channel and another channel above the primary channel |
| 2 | 40 MHz-the primary channel and another channel below the primary channel |
| 3 | Any channel bandwidth within a channel bandwidth set range supported by an STA |
| 4-255 | Reserved |

The STA may transmit to the AP the notify channel width action frame which is set to the channel bandwidth field setting value of Table 5 and which corresponds to a bandwidth and a channel to be used by the STA, so as to report the secondary channel to be used by the STA.

FIG. 9 is a block diagram showing a wireless apparatus for implementing an embodiment of the present invention. A wireless apparatus 900 may be a part of a non-AP STA or an AP.

The wireless apparatus 900 includes a frame generator 910 and a frame transmitter 920. The frame generator 910 generates a PPDU frame according to the aforementioned embodiment. In this case, channel allocation information is included in a PLCP header (more specifically, a VHTSIG field) of the PPDU. The frame transmitter 920 transmits the generated frame to one or more wireless apparatuses.

The frame generator 910 and the frame transmitter 920 may be implemented into one chip in a form of a processor. An embodiment for generating a frame may be configured with software modules, may be stored in a memory, and may be executed by the processor.

Although a series of steps or blocks of a flowchart are described in a particular order when performing methods in the aforementioned exemplary system, the steps of the present invention are not limited thereto. Thus, some of these steps may be performed in a different order or may be concurrently performed. Those skilled in the art will understand that these steps of the flowchart are not exclusive, and that another step can be included therein or one or more steps can be omitted without having an effect on the scope of the present invention.

The aforementioned embodiments include various exemplary aspects. Although all possible combinations for representing the various aspects cannot be described, it will be understood by those skilled in the art that other combinations are also possible. Therefore, all replacements, modifications and changes should fall within the spirit and scope of the claims of the present invention.

What is claimed:

1. A method for a wireless local area network, the method performed by a station comprising:
   receiving a requesting frame for requesting a transmission of a physical layer protocol data unit (PPDU) from an access point (AP), the requesting frame including bandwidth information, identification information, modulation and coding scheme (MCS) information and channel allocation information,
   the bandwidth information indicating a bandwidth over which the requesting frame is transmitted,
   the identification information indicating the station for the which the channel allocation information is intended,
   the MCS information indicating a MCS of the requested PPDU,
   the channel allocation information indicating a plurality of allocated channels on which the station will perform clear channel assessment (CCA) before transmitting the requested PPDU as a response to the requesting frame;
   performing CCA on the plurality of allocated channels to determine whether the plurality of allocated channels are idle; and
   only if all of the plurality of allocated channels are idle, transmitting the requested PPDU to the AP as a response to the requesting frame through the plurality of allocated channels,
   wherein the station does not transmit the requested PPDU through the plurality of allocated channels if any one of the plurality of allocated channels is not idle.

2. The method of claim 1, wherein each of the plurality of allocated channels has a bandwidth of 20 MHz.

3. The method of claim 1, wherein the plurality of allocated channels includes a primary channel and two secondary channels.

4. The method of claim 3, wherein the primary channel is positioned between the two secondary channels.

5. A device for a wireless local area network, the device comprising:
- a processor; and
- a memory operatively coupled with the processor and storing instructions that when executed by the processor cause the device to:
- receive a requesting frame for requesting a transmission of a physical layer protocol data unit (PPDU) from an access point (AP), the requesting frame including bandwidth information, identification information, modulation and coding scheme (MCS) information and channel allocation information,
  - the bandwidth information indicating a bandwidth over which the requesting frame is transmitted,
  - the identification information indicating the device for the which the channel allocation information is intended,
  - the MCS information indicating a MCS of the requested PPDU,
  - the channel allocation information indicating a plurality of allocated channels on which the station will perform clear channel assessment (CCA) before transmitting the requested PPDU as a response to the requesting frame;
- perform CCA on the plurality of allocated channels to determine whether the plurality of allocated channels are idle; and
- only if all of the plurality of allocated channels are idle, transmit the requested PPDU to the AP as a response to the requesting frame through the plurality of allocated channels,
- wherein the device does not transmit the requested PPDU through the plurality of allocated channels if any one of the plurality of allocated channels is not idle.

6. The device of claim 5, wherein each of the plurality of allocated channels has a bandwidth of 20 MHz.

7. The device of claim 5, wherein the plurality of allocated channels includes a primary channel and two secondary channels.

8. The device of claim 7, wherein the primary channel is positioned between the two secondary channels.

* * * * *